(12) United States Patent
Wallace

(10) Patent No.: US 8,069,975 B2
(45) Date of Patent: Dec. 6, 2011

(54) CONVEYOR BELT RIP DETECTION SYSTEM

(75) Inventor: Jack Bruce Wallace, Powell, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 35 days.

(21) Appl. No.: 12/620,074

(22) Filed: Nov. 17, 2009

(65) Prior Publication Data

US 2010/0122893 A1 May 20, 2010

Related U.S. Application Data

(60) Provisional application No. 61/115,270, filed on Nov. 17, 2008.

(51) Int. Cl.
*B65G 43/00* (2006.01)

(52) U.S. Cl. .................... 198/810.02; 198/847

(58) Field of Classification Search ............. 198/810.02, 198/847
See application file for complete search history.

(56) References Cited

U.S. PATENT DOCUMENTS

| | | | | |
|---|---|---|---|---|
| 3,636,436 | A | * | 1/1972 | Kurauchi et al. ............. 324/226 |
| 3,742,477 | A | | 6/1973 | Enabnit ..................... 198/810.02 |
| 3,750,129 | A | * | 7/1973 | Takeno et al. ............ 198/810.02 |
| 3,834,518 | A | * | 9/1974 | Specht et al. ............. 198/810.02 |
| 3,834,524 | A | * | 9/1974 | Ratz et al. ................. 198/810.02 |
| 3,922,661 | A | | 11/1975 | Enabnit et al. ........... 198/810.02 |
| 4,437,563 | A | * | 3/1984 | Oriol ........................ 198/810.02 |
| 4,621,727 | A | | 11/1986 | Strader .................... 198/810.02 |
| 4,854,446 | A | | 8/1989 | Strader .................... 198/810.02 |
| 6,352,149 | B1 | | 3/2002 | Gartland ................... 198/810.02 |
| 6,581,755 | B1 | * | 6/2003 | Wilke et al. ............. 198/810.03 |
| 6,715,602 | B1 | | 4/2004 | Gartland ................... 198/810.02 |
| 6,979,815 | B2 | * | 12/2005 | Duhamel .................. 250/223 R |
| 6,988,610 | B2 | | 1/2006 | Fromme et al. |
| 7,810,634 | B2 | * | 10/2010 | Wallace et al. .......... 198/810.02 |

FOREIGN PATENT DOCUMENTS

GB 2303834 A * 3/1997
WO WO 2007/026135 A1 3/2007

* cited by examiner

*Primary Examiner* — Mark A Deuble
(74) *Attorney, Agent, or Firm* — Alvin T. Rockhill; Kathleen K. Bowen

(57) ABSTRACT

The present invention provides a conveyor belt rip detection system with belts having rip detection inserts that can be more easily integrated into conveyor belts at low cost. These rip detection inserts do not adversely affect the durability of the conveyor belt and can be easily replaced in the event of belt damage. This rip detection system also provides a highly reliable early image of belt damage that can facilitate quick repair before extensive belt damage occurs. The present invention more specifically discloses a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are spaced incrementally across the width of the belt.

15 Claims, 3 Drawing Sheets

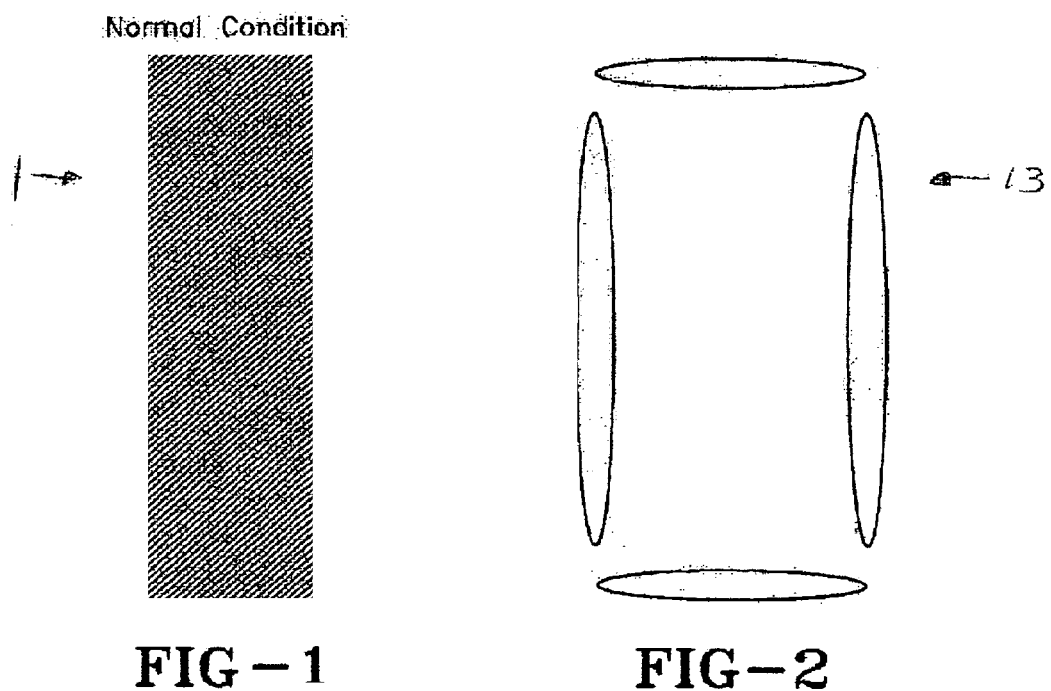

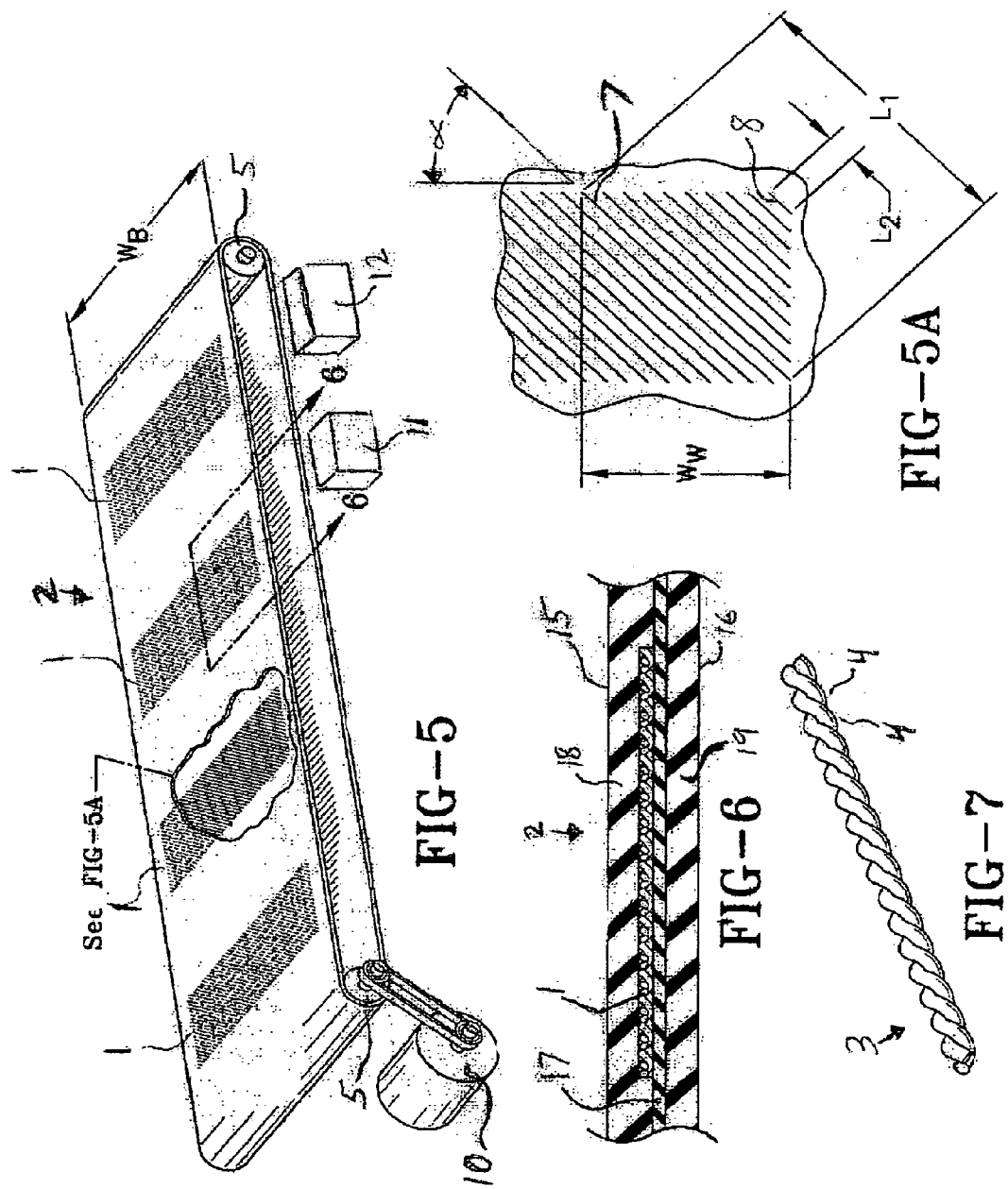

CONVEYOR BELT RIP DETECTION SYSTEM

This application claims the benefit of U.S. Provisional Patent Application Ser. No. 61/115,270, filed on Nov. 17, 2008. The teachings of U.S. Provisional Patent Application Ser. No. 61/115,270 are incorporated herein by reference in their entirety.

BACKGROUND OF THE INVENTION

Conveyor belts are widely used for moving minerals, coal, and a wide variety of manufactured products from one point to another. Heavy duty conveyor belts used in mining operations can extend over distances of several miles and represent a high cost component of an industrial material handling operation. Unfortunately, such conveyor belts are susceptible to damage from the material transported thereon and a rip, slit, cut or tear may develop within the belt. For instance, sharp edges of the material being transported can gouge the surface of the belt and that can result in a rip developing.

After being detected a torn or ripped belt can be repaired. However, the cost of repairing a heavy duty conveyor belt and cleaning up material spilled as a result of the damage can be substantial. In cases where such damage is not detected and repaired promptly, the rip typically propagates along the length of the belt with continued use of the conveyor system which makes the repair even more difficult and costly. It is accordingly desirable to detect damage to the belt as soon as possible after it occurs and to quickly repair the damaged area of the belt. By doing so the extent of the damage to the belt can be minimized and the spillage of material being conveyed can be reduced.

Over the years, a number of systems have been developed for detecting belt damage and for automatically stopping further movement of the belt after the damage occurs. It is well known to employ sensors within conveyor belts as part of a rip detection system. In a typical system, sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically, an electrical energy source external to the belt is inductively or capacitively coupled to a sensor loop in the belt. A break in the conductive wire loop of the sensor may be detected by a remote transmitter/receiver (exciter/detector). Disposition of a plurality of such sensors at intervals along the conveyor may be effected with each sensor passing within read range of one or more exciter/detectors at various locations. A rip or tear will encounter and damage a proximal sensor loop and the existence of the tear will be detected when the proximal sensor loop damage is detected as an open circuit by the reader at its next pass. In this manner, the existence of a tear will be promptly detected and repaired with further damage to the belt being minimized.

U.S. Pat. No. 3,742,477 discloses a "figure eight" sensor loop useful within a belt sensor system. U.S. Pat. No. 3,922,661 discloses an electronic control system for conveyor belts which monitors the condition of embedded sensor conductors in the belt and provides a warning indication and/or shutdown of the conveyor when damage occurs to the belt or control circuitry.

U.S. Pat. No. 4,621,727 discloses a reinforced conveyor belt having included therein a conductor for use in a rip monitoring system, said belt comprising: (a) an elastomeric body having an upper carrying surface and a parallel lower pulley engaging surface, each surface extending indefinitely in a direction of travel of the belt; (b) a plurality of reinforcement layers positioned within said elastomeric body; (c) a plurality of envelopes of low coefficient of friction material positioned within said elastomeric body and spaced apart in the direction of travel of the belt, wherein each envelope establishes a void area in said elastomeric body within said envelope; and (d) a shaped conductor positioned within said envelope such that said conductor is free to move within said void area during operation of said reinforced conveyor belt.

U.S. Pat. No. 4,854,446 discloses "figure eight" sensor loops disposed at intervals along a conveyor belt. This reference more specifically reveals an endless conveyor belt having a direction of travel comprising: (a) an elastomeric body having a load carrying surface and a parallel pulley engaging surface; (b) a reinforcement ply disposed within said elastomer body; and (c) a conductor, disposed within said belt in a predetermined pattern forming a closed current path; and wherein said conductor comprises a plurality of strength filaments or strands of a first metal wrapped about a conductive core of a second metal, said strength filaments or strands having a higher fatigue resistance than the conductive core, for increasing the fatigue resistance of the conductive core.

U.S. Pat. No. 6,352,149 provides a system in which antennae are embedded in a conveyor belt to couple with an electromagnetic circuit consisting of two detector heads and an electronic package. Coupling occurs only when an antenna passes across the detector heads and can only occur when the loop integrity has not been compromised. U.S. Pat. No. 6,352,149 more specifically reveals a conveyor belt incorporating within it a rip detection sensor comprising a conductor formed in an endless loop arranged in a signal inverting configuration wherein the conductor crosses itself in at least one crossing place, characterized in that: the conductor is formed as microcoil springwire; the conductor crosses itself by crossing through itself such that the microcoil springwire resides substantially in a single plane throughout the sensor including the crossing places; and means for preventing short-circuiting of the conductor at the crossing places.

U.S. Pat. No. 6,715,602 discloses a conveyor belt incorporating within it a rip detection sensor comprising a conductor formed in an endless loop, characterized in that: the belt includes at least one transponder secured to the belt in coupled relationship with the conductor; and the transponder transmits information identifying the location of the conductor along the belt.

U.S. Pat. No. 6,988,610 discloses an inspection system for detecting and reporting conditions of a conveyor belt, the system comprising: a controller comprising a splice detection program for receiving image data from at least one camera structured and arranged to capture an image of a portion of a conveyor belt, for detecting a splice in the image of the portion of the conveyor belt by processing the received image data, and for generating status information associated with the portion of the conveyor belt based on a detected splice.

International Patent Publication No. WO 2007/026135 A1 reveals a system for monitoring operation of a conveyor belt installation which comprises a conveyor belt having steel or other relatively magnetically permeable reinforcing material, said system comprising a field generator arranged in proximity to the conveyor belt to generate a magnetic field, a sensor unit arranged in proximity to the conveyor belt at a position downstream from the field generator as considered in a normal direction of belt movement, said sensor unit sensing the magnetic field emanating from the passing conveyor belt, and monitoring means to receive data related to the magnetic field properties sensed by the sensor unit during a plurality of passages of each of the length of the conveyor belt past the sensor unit, said monitoring means incorporating comparison means to compare a subsequently received set of data with an earlier received set of data, and output means to provide an output signal representative of reinforcement damage or deterioration when subsequently received data has departed from earlier received data by more than a prescribed extent.

Prior art rip detection panels generate issues that can either affect the integrity of the belt or the ability to replace damaged loops. Rip detection panels with wires running transversely to the conveyor belt are desirable from a manufacturing standpoint. However, such rip detection panels generate undesirable flexural properties that can result in premature failure of the conveyor belt. There is accordingly a need for a reliable rip detection system that can be inexpensively build into conveyor belts and easily replaced in the case of damage. It is also important for such a conveyor belts to be highly durable.

SUMMARY OF THE INVENTION

The present invention provides a conveyor belt rip detection system with belts having rip detection inserts that can be more easily integrated into conveyor belts at low cost. These rip detection inserts do not adversely affect the durability of the conveyor belt and can be easily replaced in the event of belt damage. This rip detection system also provides a highly reliable early image of belt damage that can facilitate quick repair before extensive belt damage occurs. The rip detection system of this invention also offers the advantage of being capable of ignoring damage to rip detection inserts that occurred prior to a repair while continuing to monitor the belt for future damage. Radio frequency identification tags can also be integrated into belts used in the system of this invention to identify points on the belt where damage has occurred by being placed in known proximity to rip detection inserts.

The present invention more specifically discloses a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are spaced incrementally across the width of the belt.

The subject invention further reveals a conveyor system which is comprised of (A) a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are spaced incrementally across the width of the belt; (B) a pulley system which is adapted for receiving the pulley engaging surface of the belt, (C) a means for driving the belt along the pulley system, (D) a means for generating a magnetic field within the rip detection wires, and (E) a means for detecting the magnetic field produced by the rip detection wires. In order to determine the length of a rip detection panel and to distinguish it from a belt splices, it is advantageous to integrate a tachometer, proximity sensor or encoder into the system.

The present invention also discloses a method for detecting damage to a conveyor belt as the conveyor belt advances through a conveyor system said method comprising monitoring images of the magnetic field associated with a plurality of rip detection inserts as the conveyor belt advances through the conveyor system for subdivisions into multiple sub-panel magnetic images, wherein the conveyor system includes (A) a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are spaced incrementally across the width of the belt; (B) a pulley system which is adapted for receiving the pulley engaging surface of the belt; (C) a means for driving the belt along the pulley system; (D) a means for generating a magnetic field within the rip detection wires; (E) a means for detecting images of the magnetic field associated with the rip detection inserts; and (F) monitoring the magnetic fields associated with the rip detection inserts for subdivisions into multiple sub-panel magnetic images.

The subject invention further reveals a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, wherein the rip detection wires vary in length along a line running through the rip detection inserts which is perpendicular to the bias angle, and wherein the shortest rip detection wires have a length which is less than about 50% of the length of the longest rip detection wires in the rip detection inserts.

The subject invention also reveals a conveyor system which is comprised of (A) a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 30° to 60° from being perpendicular to the longitudinal direction of the belt, wherein the rip detection wires vary in length along a line running through the rip detection inserts which is perpendicular to the bias angle, and wherein the shortest rip detection wires have a length which is less than about 50% of the length of the longest rip detection wires in the rip detection inserts; (B) a pulley system which is adapted for receiving the pulley engaging surface of the belt, (C) a means for driving the belt along the pulley system, (D) a means for generating a magnetic field within the rip detection wires, and (E) a means for detecting the magnetic field produced by the rip detection wires.

The subject invention further discloses method for detecting damage to a conveyor belt as the conveyor belt advances through a conveyor system said method comprising monitoring images of the magnetic field associated with a plurality of rip detection inserts as the conveyor belt advances through the conveyor system for subdivisions into multiple sub-panel magnetic images, wherein the conveyor system includes (A) a conveyor belt comprising (1) an elastomeric body having a load carrying surface and a parallel pulley engaging surface; (2) a reinforcement ply disposed within the elastomeric body; and (3) the plurality of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 30° to 60° from being perpendicular to the longitudinal direction of the belt, wherein the rip detection wires vary in length along a line running through the rip detection inserts which is perpendicular to the bias angle, and wherein the shortest rip detection wires have a length which is less than about 50% of the length of the longest rip detection wires in the rip detection inserts; (B) a pulley system which is adapted for receiving the pulley engaging surface of the belt; (C) a means for driving the belt along the pulley system; (D) a means for generating a magnetic field within the rip detection wires; and (E) a means for detecting images of the magnetic field associated with the rip detection inserts.

The present invention also reveals a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are comprised of at least one steel filament having a diameter within the range of 0.1 mm to 0.6 mm.

The subject invention further discloses a conveyor system which is comprised of (A) a conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, and wherein the rip detection wires are comprised of at least one steel filament having a diameter within the range of 0.1 mm to 0.6 mm; (B) a pulley system which is adapted for receiving the pulley engaging surface of the belt, (C) a means for driving the belt along the pulley system, (D) a means for generating a magnetic field within the rip detection wires, and (E) a means for detecting the magnetic field produced by the rip detection wires.

BRIEF DESCRIPTION OF THE DRAWINGS

FIG. 1 is a schematic cross-sectional view of a rip detection insert of this invention showing a plurality of rip detection wires therein wherein the rip detection insert has not be subjected to belt damage.

FIG. 2 illustrates the magnetic field image of the rip detection insert shown in FIG. 1 (without belt damage).

FIG. 5 is a schematic isometric view of a conveyer belt including the rip detection inserts of this invention.

FIG. 5a is a cut-away section of the belt of FIG. 5 illustrating the rip detection wires of the rip detection inserts of this invention.

FIG. 6 is a cross-sectional view of the rip detection inserts of this invention

FIG. 7 is a schematic isometric view of a rip detection wire for use in the rip detection insert of this invention.

DETAILED DESCRIPTION OF THE INVENTION

Figures 3, 4:
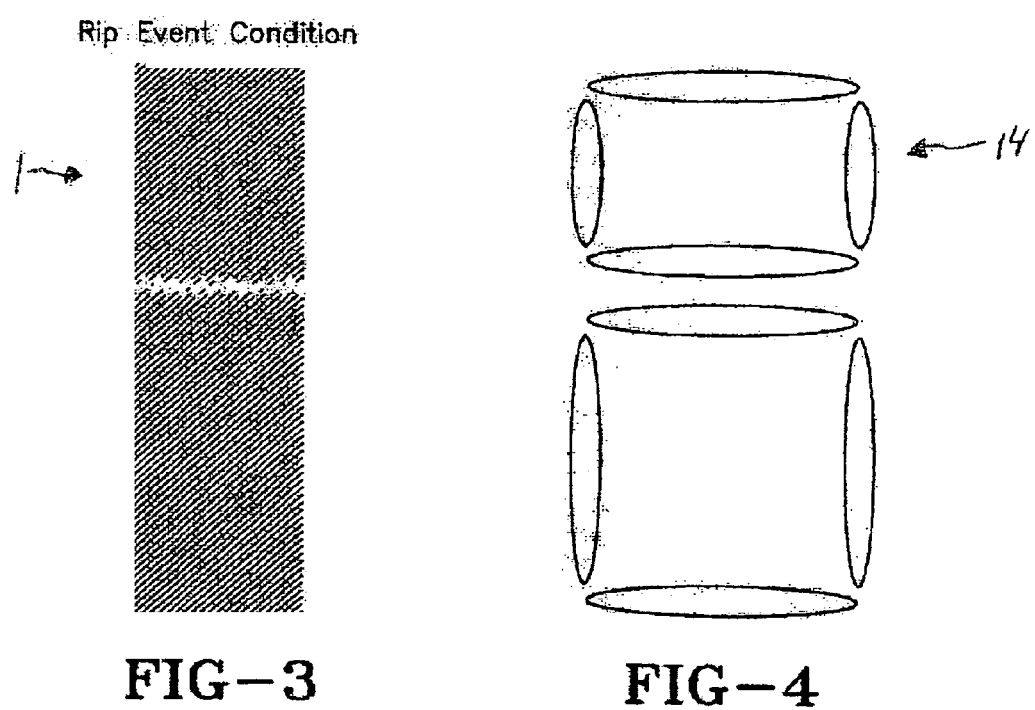
FIG. 3 is a schematic cross-sectional view of a rip detection insert of this invention wherein a rip has occurred breaking the rip detection wires at the point of the rip.
FIG. 4 illustrates the magnetic field image of the rip detection insert shown in FIG. 3 after damage has occurred to the belt and the rip detection wires have been severed at the point of the rip. As can be seen, the magnetic field associated with the rip detection insert has been subdivided into two distinct sub-panel magnetic images.

The conveyor belts of this invention have an elastomeric body (carcass section) with a load carrying surface 15 on the top side thereof and a pulley engaging surface 16 on the bottom side thereof. These conveyor belts will also include at least one reinforcement ply 17 disposed within the elastomeric body and a multitude of rip detection inserts 1. The rip detection inserts will be spaced incrementally along the length of the conveyor belt 2. They can be positioned in the top cover 18 or the pulley cover 19 of the belt.

The elastomeric body will normally include plies of fabric or reinforcing steel cables that typically run longitudinally within the conveyor belt. The conveyor belts of this invention can optionally also contain conventional inductive belt damage sensor loops including embedded transducer elements. Conventional rip detection systems of this type are described in U.S. Pat. No. 4,621,727, U.S. Pat. No. 4,854,446, and U.S. Pat. No. 6,715,602. The teachings of U.S. Pat. No. 4,621,727, U.S. Pat. No. 4,854,446, and U.S. Pat. No. 6,715,602 are incorporated herein by reference for the purpose of disclosing conventional rip detection and identification systems that can be used in conjunction with this invention.

FIG. 1 shows a plurality of rip detection wires 3 within a rip detection insert 1 wherein the rip detection insert 1 has not been subjected to belt damage. These rip detection inserts 1 are spaced along the longitudinal length of the conveyor belt 2. The rip detection inserts 1 contain a multitude of rip detection wires 3 that are comprised of a magnetically permeable material, such as a ferromagnetic material. For instance, the rip detection wires can be brass plated steel tire cords. It is advantageous for the rip detection wires 3 to be steel filaments 4 having a diameter within the range of 0.1 mm to about 0.6 mm and preferable for the filaments 4 to have a diameter within the range of 0.2 min to 0.4 mm. It is also advantageous for the filaments 4 to be wound into wire bundles comprising from 2 to about 12 filaments or even about 18. The rip detection wires can be tire cords having a wide variety of constructions with or without a spiral wrap. Some representative examples of constructions that can be used include 2×, 3×, 4×, 5×, 6×, 7×, 8×, 11×, 12×, 1+2, 1+3, 1+4, 1+5, 1+6, 1+7, 1+8, 2+1, 2+2, 2+7, 2+8, 2+9, 2+10, 3+1, 3+2, 3+3, and 3+9. A more detailed description of steel tire cords containing up to 12 filaments that can be advantageously used as rip detection wires in the practice of this invention is provided in U.S. Pat. No. 6,247,514. The teachings of U.S. Pat. No. 6,247,514 are incorporated by reference herein for the purpose of describing suitable steel tire cords that contain up to 12 filaments.

Some specific examples of wire constructions that can be beneficially utilized in accordance with this invention are delineated in the following table (in all cases there was one strand per wire):

| Construction | Effective Wire Gauge | Overall Wire Gauge | Filaments/ Strand |
|---|---|---|---|
| 3X.22/9X.20 + 1X.15 HT | 0.029 inch | 0.033 inch | 12 |
| 3 + 2X.35 ST | 0.031 inch | 0.042 inch | 5 |
| 3X.20/9X.175 + 1X.15 | 0.025 inch | 0.030 inch | 12 |
| 3 + 3X.35 ST | 0.034 inch | 0.043 inch | 6 |

The rip detection wires 3 are typically aligned in the rip detection inserts 1 at a bias angle $\alpha$ of 15° to 75° from being perpendicular to the longitudinal direction of the belt. The rip detection wires 3 are more typically aligned in the rip detection inserts 1 at a bias angle $\alpha$ of 30° to 60° and are preferably aligned in the rip detection inserts 1 at a bias angle $\alpha$ of 40° to 50°.

The rip detection wires 3 are spaced incrementally across the width of the belt WB. Normally individual rip detection wires do not extend across more than about 70% of the width of the belt WW. In most cases individual rip detection wires do not extend across more than about 50% of the width of the belt WW. More typically individual rip detection wires do not extend across more than about 40% or even 30% of the width of the belt WW.

In many cases the rip detection wires 3 will vary in length along a line running through the rip detection inserts 1 which is perpendicular to the bias angle $\alpha$, and wherein the shortest rip detection wires 8 have a length L2 which is less than about 50% of the length L1 of the longest rip detection wires 7 in the rip detection inserts 1. Typically the shortest rip detection wires 8 have a length L2 which is less than about 25% of the length L1 of the longest rip detection wires 7 in the rip detection inserts 1. In some cases the shortest rip detection wires 8 have a length L2 which is less than about 10% of the length L2 of the longest rip detection wires 7 in the rip detection inserts 1.

Conveyor systems used in conjunction with the belts of this invention will normally include a pulley system 5 which is adapted for receiving the pulley engaging surface 9 of the belts of this invention, a means 10 for driving the belt 2 along the pulley system 5, a means 11 for generating a magnetic field within the rip detection wires 3, and a means 12 for detecting the image of the magnetic field 13 and 14 produced by the rip detection wires. The image of the magnetic field 13 and 14 will normally be detected over the entire width of the belt 2. In order to determine the length of a rip detection panel it is advantageous to integrate a tachometer, proximity sensor or encoder into the system.

While certain representative embodiments and details have been shown for the purpose of illustrating the subject invention, it will be apparent to those skilled in this art that various changes and modifications can be made therein without departing from the scope of the subject invention.

What is claimed is:

1. A conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, wherein the rip detection wires are spaced incrementally across the width of the belt, and wherein individual rip detection wires do not extend across more than about 70% of the width of the belt.

2. A conveyor belt as specified in claim 1 wherein the individual rip detection wires do not extend across more than about 40% of the width of the belt.

3. A conveyor belt as specified in claim 1 wherein the bias angle is within the range of 30° to 45°.

4. A conveyor belt as specified in claim 2 wherein the bias angle is within the range of 40° to 50°.

5. A conveyor system comprising (A) the conveyor belt specified in claim 1; (B) a pulley system which is adapted for receiving the pulley engaging surface of the belt, (C) a means for driving the belt along the pulley system, (D) a means for generating a magnetic field within the rip detection wires, and (E) a means for detecting the magnetic field produced by the rip detection wires.

6. A method for detecting damage to a conveyor belt as the conveyor belt advances through a conveyor system said method comprising monitoring images of the magnetic field associated with a plurality of rip detection inserts as the conveyor belt advances through the conveyor system for subdivisions into multiple sub-panel magnetic images, wherein the conveyor system is the conveyor system specified in claim 5.

7. A method for detecting damage to a conveyor belt as specified in claim 6 characterized in that the image of the magnetic field extends over the width of the conveyor belt.

8. A method for detecting damage to a conveyor belt as specified in claim 6 characterized in that an alarm is triggered in the event that subdivisions into multiple sub-panel magnetic images is detected.

9. A conveyor belt comprising (1) an elastomeric body having a load carrying surface and a parallel pulley engaging surface; (2) a reinforcement ply disposed within the elastomeric body; and (3) a multitude of rip detection inserts, wherein the rip detection inserts are spaced along the longitudinal length of the conveyor belt, wherein the rip detection inserts contain a multitude of rip detection wires that are comprised of a magnetically permeable material, wherein the rip detection wires are aligned in the rip detection inserts at a bias angle of 15° to 75° from being perpendicular to the longitudinal direction of the belt, wherein the rip detection wires vary in length along a line running through the rip detection inserts which is perpendicular to the bias angle, and wherein the shortest rip detection wires have a length which is less than about 50% of the length of the longest rip detection wires in the rip detection inserts.

10. A conveyor belt as specified in claim 9 wherein the shortest rip detection wires have a length which is less than about 25% of the length of the longest rip detection wires in the rip detection inserts.

11. A conveyor belt as specified in claim 9 characterized in that the rip detection inserts are rectangular in shape.

12. A conveyor system comprising (A) the conveyor belt specified in claim 9; (B) a pulley system which is adapted for receiving the pulley engaging surface of the belt, (C) a means for driving the belt along the pulley system, (D) a means for generating a magnetic field within the rip detection wires, and (E) a means for detecting the magnetic field produced by the rip detection wires.

13. A method for detecting damage to a conveyor belt as the conveyor belt advances through a conveyor system said method comprising monitoring images of the magnetic field associated with a plurality of rip detection inserts as the conveyor belt advances through the conveyor system for subdivisions into multiple sub-panel magnetic images, wherein the conveyor system is the conveyor system delineated in claim 12.

14. A conveyor belt as specified in claim 1 wherein the rip detection wires are comprised of at least one steel filament having a diameter within the range of 0.1 mm to 0.6 mm.

15. A conveyor belt as specified in claim 14 wherein the rip detection wires are comprised of at least two steel filaments that are wound together.

* * * * *